United States Patent
Lashmore

[11] Patent Number: 6,042,949
[45] Date of Patent: Mar. 28, 2000

[54] HIGH STRENGTH STEEL POWDER, METHOD FOR THE PRODUCTION THEREOF AND METHOD FOR PRODUCING PARTS THEREFROM

[75] Inventor: David S. Lashmore, Lebanon, N.H.

[73] Assignee: Materials Innovation, Inc., West Lebanon, N.H.

[21] Appl. No.: 09/196,203

[22] Filed: Nov. 20, 1998

Related U.S. Application Data

[63] Continuation-in-part of application No. 09/010,073, Jan. 21, 1998, and a continuation-in-part of application No. PCT/US98/05597, Mar. 23, 1998.

[51] Int. Cl.$^7$ .................................................. B32B 5/16
[52] U.S. Cl. ......................... 428/570; 428/403; 428/701; 428/702
[58] Field of Search ................... 428/570, 403, 428/701, 702; 75/245

[56] References Cited

U.S. PATENT DOCUMENTS

| | | | |
|---|---|---|---|
| 3,856,478 | 12/1974 | Iwata et al. | 29/182 |
| 4,082,580 | 4/1978 | Pfeifer et al. | 148/31.55 |
| 4,090,868 | 5/1978 | Tengzelius et al. | |
| 4,126,452 | 11/1978 | Tengzelius et al. | |
| 4,128,420 | 12/1978 | Esper et al. | 75/230 |
| 4,251,599 | 2/1981 | McCormick | 428/682 |
| 4,261,741 | 4/1981 | Terrat | 75/134 |
| 4,266,974 | 5/1981 | Nitta et al. | |
| 4,640,722 | 2/1987 | Gorman | 148/325 |
| 4,954,171 | 9/1990 | Takajo et al. | |
| 5,021,085 | 6/1991 | Karagoz et al. | |
| 5,108,439 | 4/1992 | Causton | |
| 5,108,493 | 4/1992 | Causton | 75/255 |
| 5,217,683 | 6/1993 | Causton | 419/38 |
| 5,292,382 | 3/1994 | Longo | 148/320 |
| 5,338,508 | 8/1994 | Nitta et al. | |
| 5,525,140 | 6/1996 | Wisell | |

(List continued on next page.)

OTHER PUBLICATIONS

Lorin, Guy, *Phosphating of Metals* (1974) Finishing Publications, Ltd., Middlesex, Great Britain; pp. 4, 7–76.

Freeman, D.B., *Phosphating and metal pre–treatment* (1986) Industrial Press, Inc., New York; pp. 9–42.

Rausch, Werner, *The Phosphating of Metals* (1990) Finishing Publications, Ltd., Great Britain; pp. 47–136.

*Primary Examiner*—Hoa T. Le
*Attorney, Agent, or Firm*—Fran S. Wasserman

[57] ABSTRACT

Steel powder for use in case hardenable steels is provided. The steel powder is made from a plurality of pre-alloyed iron-molybdenum particles. Each of the particles has from about 1.5 to about 3.5 percent by weight of molybdenum and have a diameter of from about 20 to about 200 microns. The powders further have from about 0.001% by weight to about 0.5% by weight of a coating. The coating is made up of from about 40% to about 85% by weight of one or more of FeO, $Fe_3O_4$, $Fe_2O_3$, $(Fe_2O_3.H_2O)$ and combinations thereof; and from about 15% to about 60% by weight of one or more of $FePO_4$, $Fe_3(PO_4)_2$, $FeHPO_4$, $Fe_3(PO_4)_2.2H_2O$, $Fe_2(PO_4)_3.8H_2O$, $FeCrO_4$, $FeMoO_4$, $FeC_2O_4$, and $FeWO_4$.

Also provided is a steel powder composition for use in manufacturing sinter hardenable structural parts. The powder is made from a plurality of pre-alloyed steel particles of from about 0.5 to about 3.5 percent by weight of molybdenum, from about 0% to about 0.5% by weight nickel and from about 0% to about 0.6% manganese and from about 0.05 to about 0.08 percent by weight of the mixture of particulates of graphite. The particles have a diameter of from about 20 to about 200 microns and each of the particles has from about 0.5% by weight to about 2% by weight of a coating disposed thereon. The coating is a substantially uniform metallurgical layer of one or more of copper, cobalt, nickel, and chromium.

An article made by compressing this steel powder composition has an as pressed "green" strength of at least about 10 Kpsi as measured in accordance with MPIF 41 (ASTM B312/B528).

1 Claim, 3 Drawing Sheets

U.S. PATENT DOCUMENTS

| | | | |
|---|---|---|---|
| 5,531,955 | 7/1996 | Sugikawa . | |
| 5,567,890 | 10/1996 | Lindberg et al. | 75/243 |
| 5,589,011 | 12/1996 | Gonsalves | 148/334 |
| 5,605,559 | 2/1997 | Unami et al. . | |
| 5,628,046 | 5/1997 | Dautzenberg et al. . | |
| 5,663,124 | 9/1997 | Rao et al. | 508/150 |
| 5,817,731 | 10/1998 | Yoshida et al. . | |

HIGH STRENGTH STEEL POWDER, METHOD FOR THE PRODUCTION THEREOF AND METHOD FOR PRODUCING PARTS THEREFROM

This is a continuation-in-part of U.S. patent application Ser. No. 09/010,073 filed on Jan. 21, 1998 and of PCT International Application No. PCT/US98/05597 filed on Mar. 23, 1998.

FIELD OF THE INVENTION

This invention is directed to high strength steel powders. More particularly, the invention relates to high strength steel powders of case hardening oxide-phosphate coated iron molybdenum alloys and sinter hardenable copper coated pre-alloyed steel-graphite. The invention is further directed to methods for producing such high strength steel powders and to parts including green strength parts made therefrom.

BACKGROUND OF THE INVENTION

Powder metallurgy, i.e., pressing powdered metals in die presses to make parts, is used by a variety of industries as an inexpensive source of parts. Steel powders are used in the presses to produce structural parts. In general, raw material steel powders are press molded to produce a green compact, the green compact is sintered and heat treated, and then further subjected to coining, forging heat-treatment, cutting, etc. to produce a final product having relatively high strength. Structural steel parts that are fabricated using presently available powder metallurgy techniques and materials are however, generally not very dense, have fair to moderate fracture toughness and have relatively low green strengths thus requiring prolonged sintering at very high temperatures. Typical green strengths for commercial high strength steels range from 1.5 to 4 Kpsi but are for the most part lower than 2.0. Further, the low green strength makes it very difficult to "green machine" the parts as they are removed from the press and following sinter hardening, they are nearly impossible to machine.

Complex part shapes such as class 9 and 10 helical gears, other high precision gears, and sprockets with tight dimensional tolerances cannot, in general, be made from these high strength steels by powder metallurgy using present techniques because the required high temperature sintering step (to increase the density of the part) distorts the part from its original shape and thus requires secondary operations such as grinding, turning or surface densification. Such complex parts are therefore individually machined using expensive techniques. Thus, there exists a need for materials from which high green strength parts can be made to avoid prolonged high temperature sintering and minimize distorting the shape of the pressed parts. There also exists a need for parts that can be green machined.

In order to fabricate high strength steel powders the methods commonly known as premixing and prealloying are used. Premixing is a method of mixing an iron powder with a metal or metalloid powder or an alloy powder, compacting them and subsequently sintering the compact under heat to solid-solubilized these added metals and in some cases added carbon or phosphorus. This method is less than ideal because the added metal powder in the iron powder causes separation or segregation due to the difference between the respective specific gravities and particle shapes of the iron powder and the additive powder(s). This then leads to a problem of part quality by causing wide variability in the strength and the size of the sintered product. This problem is especially pronounced in very small parts.

Prealloying involves using an alloyed steel powder in which alloying elements such as nickel, carbon, copper, molybdenum and chromium are solid-solubilized into the iron before compaction. This method is used to avoid the separation problems of premixing. U.S. Pat. No. 5,240,742 to Johnson et al. provides a variation of such a prealloying method. These partially alloyed powders are then compacted and the compacts are subjected to high temperature sintering. This process does however, have its disadvantages. Namely, since the alloyed steel powder obtained by such prealloying processes is relatively hard when compared with pure iron powder, compaction density cannot be increased sufficiently during compaction making it difficult to obtain a green product of high density, hence the subsequent requirement of high temperature sintering. Accordingly, in prealloying processes such as that of Johnson et al., full advantage of the superior physical properties of alloyed steel cannot be taken. Additionally, the chemical precursors of Johnson et al. have the potential to introduce contaminants into the finished pressed part. High temperature sintering also makes the powders and method of Johnson et al. particularly unsuitable for making parts of complex geometry and tight dimensional control. U.S. Pat. No. 5,628,046 to Dautzenberg et al. teaches a process for fabricating sintered articles from a molybdenum containing steel alloy. These articles are said to have increased as pressed density. These as-pressed articles are however not very green strong and cannot therefore be green machined.

Thus there further exists a need for a method by which the green strength and other properties of pressed steel structural parts can be increased which overcomes the disadvantages of prior art materials and methods. Additionally, as part sizes become smaller and smaller, any segregation in the composition of the parts becomes magnified. Thus, there also exists a need for high strength steel parts that are extremely uniform in overall composition.

SUMMARY OF THE INVENTION

It is therefore an object of the present invention to provide high strength steel powders for making structural parts from particulates of pre-alloyed steel that, inter alia, overcomes the aforementioned disadvantages. The present invention provides a method for increasing the green strength of parts made by pressing powders of steel materials, such as iron-molybdenum pre-alloys and nickel-iron-molybdenum pre-alloys and for producing highly uniform part compositions.

The present invention is therefore directed to steel powder comprising a plurality of pre-alloyed iron-molybdenum particles comprising from about 0.5 to about 3.5 percent by weight of molybdenum. The pre-alloyed particles have a diameter of from about 20 to about 200 microns and there is a coating disposed on each of them. In this embodiment, the coating comprises from about 0.001% by weight to about 0.5% by weight of the particles. The coating comprises from about 40% to about 85% by weight of a member selected from the group consisting of FeO, $Fe_3O_4$, $Fe_2O_3$, $(Fe_2O_3.H_2O)$ and combinations thereof; and from about 15% to about 60% by weight of a member selected from the group consisting of $FePO_4$, $Fe_3(PO_4)_2$, $FeHPO_4$, $Fe_3(PO_4)_2.2H_2O$, $Fe_2(PO_4)_3.8H_2O$, $FeCrO_4$, $FeMoO_4$, $FeC_2O_4$, $FeWO_4$, and combinations thereof. The coating permits adjacent particles to engage one another with a force such that a part made by compressing the coated pre-alloyed molybdenum iron particles has a green transverse rupture strength of at least about 10,000 Kpsi as measured in accordance with MPIF 41 (ASTM B312/B528).

The invention is also directed to the aforementioned coating material for particles of pre-alloyed molybdenum iron.

The invention also includes a method for making the aforementioned high strength steel powder. The first step in the method comprises providing a plurality of pre-alloyed iron-molybdenum particles. The pre-alloyed particles comprise from about 0.5 to about 3.5 percent by weight of molybdenum. The method further comprises treating the particles with an aqueous solution having a pH of about 5.5. The aqueous solution comprises from about 5 to about 50 grams per liter of a member selected from the group consisting of a primary alkaline phosphate, an alkaline chromate, an alkaline tungstate, an alkaline molybdate, an alkaline oxalate and combinations thereof; from about 0.1 to about 50 grams per liter of an oxidizing agent; and from about 0 to about 0.5 grams per liter of one or more of a wetting agent, and a surfactant. The aqueous solution has a temperature of from about 20° C. to about 60° C. The treating step is performed for a time period of from about 1 minute to about 20 minutes.

The present invention also includes a method of making steel articles from the aforementioned particles of pre-alloyed iron molybdenum. The method comprises as a first step providing a plurality of pre-alloyed iron-molybdenum particles comprising from about 0.5 to about 3.5% by weight molybdenum. Each of the particles are then coated with from about 40% to about 85% by weight of one or more oxides selected from the group consisting of FeO, $Fe_3O_4$, $Fe_2O_3$, and ($Fe_2O_3.H_2O$); and from about 15% to about 60% by weight of one or more phosphates selected from the group consisting of $FePO_4$, $Fe_3(PO_4)_2$, $FeHPO_4$, $Fe_3(PO_4)_2.2H_2O$, and $Fe_2(PO_4)_3.8H_2O$. Pressure is used to consolidate the coated particles into the shape of the article, thereby producing a green part. The green part is sintered at a temperature of from about 1000° C. to about 1250° C. for a time period of from about 30 minutes to about 180 minutes. The sintered part is then subjected to an environment of an endothermic gas for a time period of from about 1 hour to about 6 hours at a temperature of about 700° C., to case harden the sintered part.

In another embodiment of this method for making articles from high strength steel the particles are coated with a conversion coating that permits adjacent particles to engage one another with a force such the article has an as pressed transverse rupture strength of at least about 10,000 Kpsi, as measured in accordance with MPIF 41 (ASTM B312/B528). The conversion coating comprises an oxide and a phosphate in a weight ratio of from about 2 parts oxide to about 4 parts oxide to about 1 part phosphate. The coating is optionally substantially free of organic materials. The coated particles are then consolidated in the shape of the article, the article is sintered and case hardened.

The aforementioned steel powders can be used to produce a green strength steel precursor article. The article comprises a three-dimensional structure comprised of consolidated pre-alloyed iron molybdenum particles. Each of the pre-alloyed particles comprises from about 0.5% by weight to about 3.5% by weight of molybdenum and substantially all particles are surrounded by a substantially uniform layer of material comprised of from about 40% to about 85% by weight of an oxide selected from the group consisting of FeO, $Fe_3O_4$, $Fe_2O_3$, ($Fe_2O_3.H_2O$) and combinations thereof; and from about 15% to about 60% by weight of a phosphate selected from the group consisting of $FePO_4$, $Fe_3(PO_4)_2$, $FeHPO_4$, $Fe_3(PO_4)_2.2H_2O$, $Fe_2(PO_4)_3.8H_2O$, and combinations thereof. The steel precursor article has a green transverse rupture strength as determined in accordance with MPIF 41 (ASTM B312/B528), of at least about 10 Kpsi.

In another embodiment, the present invention is directed to a high strength sinter hardenable steel powder composition comprising a mixture of a plurality of pre-alloyed steel particles comprised of iron and from about 0.5 to about 3.5% molybdenum, from about 0.0 to about 1% by weight of nickel and from about 0.0 to about 0.6% by weight manganese. Alternatively, particulates of nickel can be admixed with an iron-molybdenum pre-alloy instead of using a pre-alloy containing nickel. The particles have a diameter of from about 20 to about 200 microns and have from about 0.5% by weight to about 2.5% by weight of a coating disposed on them. These coated particles are admixed with particulates of graphite in an amount that is from about 0.5 to about 0.8 percent by weight of the mixture. The pre-alloyed particles have a diameter of from about 20 to about 200 microns. The coating on each of the particles comprises a substantially uniform metallurgical layer of one of the group consisting of copper, cobalt, nickel, chromium and combinations thereof.

In the aforementioned embodiment, the steel powder composition is intended for use in manufacturing sinter hardenable structural parts. An article made by compressing this steel powder composition has an as pressed "green" strength of at least about 10 Kpsi as measured in accordance with MPIF 41 (ASTM B312/B528).

The invention is also directed to a method for preparing the aforementioned high strength steel powder composition. The method comprises as a first step providing a plurality of pre-alloyed steel particles. The particles comprise iron and from about 0.5 to about 3.5% molybdenum, from about 0.0 to about 1% by weight of nickel and from about 0.0 to about 0.6 % by weight manganese and have a diameter of from about 20 to about 200 microns. Thereafter, from about 0.5% by weight to about 2.5% by weight of a substantially uniform metallurgical layer of a one of the group consisting of copper, cobalt, nickel, chromium, and combinations thereof is electroplated onto the surface of each of the pre-alloyed particles. A plurality of graphite particles having a diameter of from about 0.05 nm to about 1 $\mu$m is provided and a quantity of the pre-alloyed iron-molybdenum particles is blended with a quantity of the graphite particles so that the graphite particles comprise from about 0.05% by weight to about 0.08% by weight of the final high strength steel powder composition.

DETAILED DESCRIPTION OF THE PREFERRED EMBODIMENTS

Case Hardenable Iron-Molybdenum Steel

In a first embodiment the present invention is directed to steel powder for use in powder metallurgy. As a starting material for this embodiment it is preferred to use steel powder comprising a plurality of pre-alloyed iron-molybdenum particles although any known case hardenable pre-alloyed powder steel is suitable for use in this embodiment. For purposes of this invention case hardenable steel is intended to refer to those steels that develop a hard case or shell only and do not through harden upon heat treatment.

Figure 1:
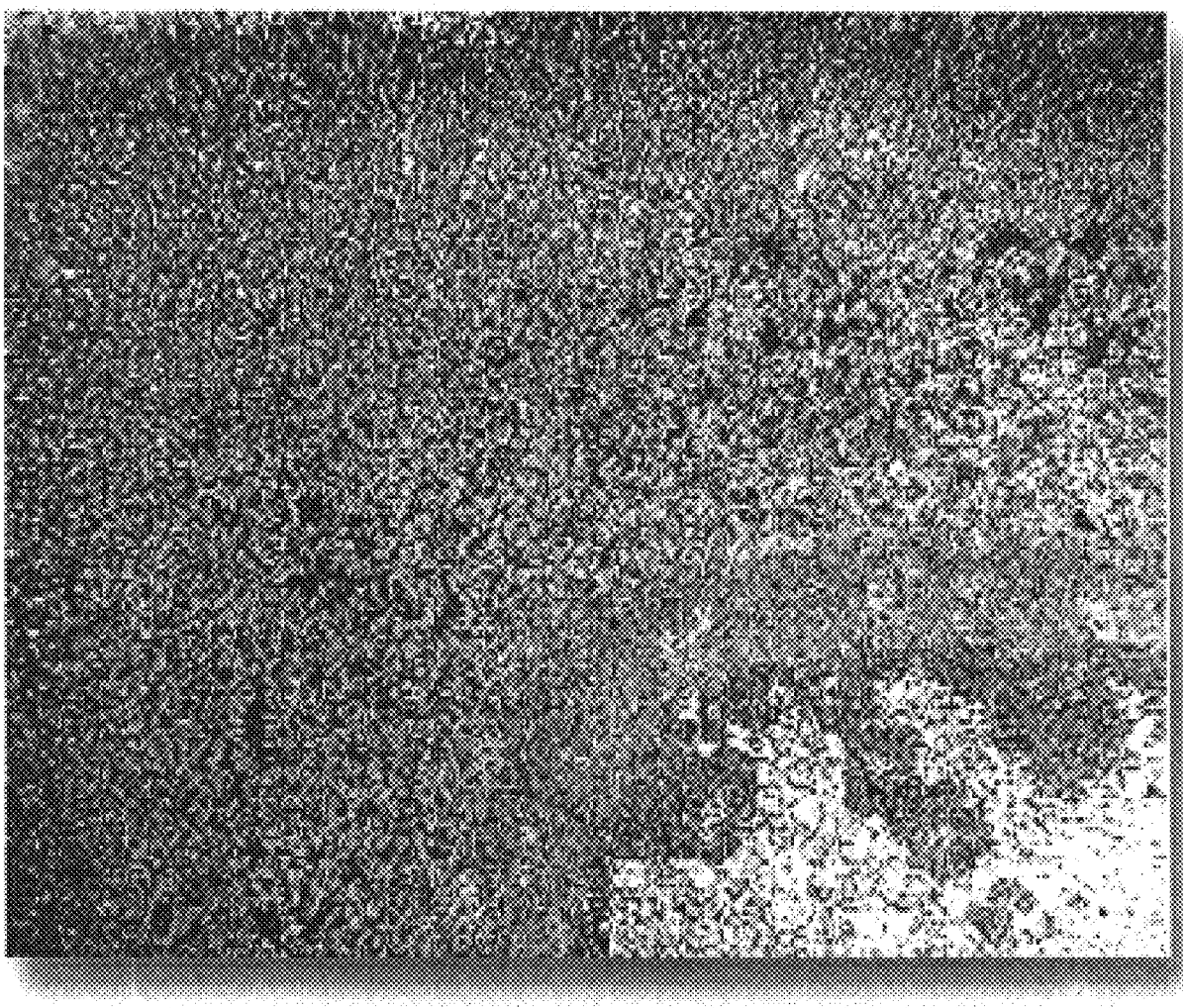
FIG. 1 is an optical metallographic cross section of a case hardened 3.5 molybdenum steel alloy.

Hence for purposes of this invention it is preferred to use iron molybdenum pre-alloyed powder comprising from about 0.5 to about 3.5 percent by weight of molybdenum. Most preferably, the pre-alloyed iron-molybdenum particles comprise about 1.5% by weight molybdenum because this composition produces a more compressible powder and is of lower cost. Additionally, 1.5 molybdenum alloys have the advantage of maintaining a body center cubic structure even at elevated temperature thereby allowing rapid diffusion so that deep case depths at relatively short carburization times are possible, the softer powder provides higher density and case hardening provides relatively high interior toughness. The rapid case hardening decreases the sintering time. As an alternative, pre-alloyed particles containing as much as 3.5% by weight molybdenum can be used. However, these tend to be slightly more expensive and the compressibility of the pre-alloy seems to decrease with increasing molybdenum content. FIG. 1 is an optical metallographic cross section of a case hardened 3.5 molybdenum steel alloy. The aforementioned advantages make powder according to this invention particularly useful in manufacturing parts for rolling contact fatigue applications.

The pre-alloy iron-molybdenum particles preferably have a diameter of from about 20 to about 200 microns and most preferably from about 60 to about 150 microns. Each of the pre-alloyed particles preferably has from about 0.5% by weight to about 2.5% by weight and preferably from about 1.5 to about 2% by weight of a coating disposed thereon.

The coating itself comprises from about 40% to about 85% and preferably from about 65% to about 80% by weight of a oxide selected from the group consisting of FeO, $Fe_3O_4$, $Fe_2O_3$, ($Fe_2O_3.H_2O$) and combinations thereof; and from about 15% to about 60% and preferably from about 20% to about 35% by weight of a member selected from the group consisting of $FePO_4$, $Fe_3(PO_4)_2$, $FeHPO_4$, $Fe_3(PO_4)_2.2H_2O$, $Fe_2(PO_4)_3.8H_2O$, $FeCrO_4$, $FeMoO_4$, $FeC_2O_4$, $FeWO_4$, and combinations thereof. Most preferably, the coating comprises from about 65% to about 80% by weight of the oxide and from about 20% to about 35% by weight of the phosphate. Preferred phosphates for use as a component of the coating include, but are not limited to $FePO_4$, $Fe_3(PO_4)_2$, $FeHPO_4$, $Fe_3(PO_4)_2.2H_2O$, $Fe_2(PO_4)3.8H_2O$, and combinations thereof.

The steel powder according to this embodiment of the present invention is intended mainly for use in manufacturing case hardenable structural parts. This invention is also directed to a coating material for use on pre-alloyed steel particles for case hardenable applications. The inventive coating is particularly advantageous because it permits adjacent particles to engage one another with a force such that a part made by compressing coated pre-alloyed molybdenum iron particles has an as pressed green transverse rupture strength of at least about 10 Kpsi and preferably at least about 15 Kpsi as measured in accordance with MPIF 41 (ASTM B312/B528). These relatively high green strengths allows an as pressed part to be "green machined" (i.e. machined before being sintered). This is a very important advantage of these powders because once the parts are sintered they can no longer be machined. Moreover, the coating according to the present invention does not interfere with the inter-diffusion of carbon during case hardening. Thus, the coating according to the present invention permits a case hardened article made from compressed pre-alloyed molybdenum iron particles having the coating disposed thereon to obtain a case depth of from about 3 mm to about 8 mm as determined by optical microscopy.

This invention is also directed to a method of making the aforementioned high strength steel powder. As a first step a plurality of pre-alloyed steel particles are provided. The pre-alloyed particles preferably have a diameter of from about 40 to about 60 microns. For purposes of the present method iron-molybdenum pre-alloy particles comprising from about 0.5 to about 3.5 percent by weight of molybdenum are preferred. Particles comprising 1.5% by weight molybdenum are particularly preferred for all of the reasons discussed at length above in connection with the particles themselves. The pre-alloy particles are treated with an aqueous solution having a pH of about 5.5 and a temperature of from about 20° C. to about 60° C. and preferably from about 35° C. to about 45° C.

The treating step is performed for a time period of from about 1 minute to about 20 minutes and preferably from about 3 to about 10 minutes. In any event, the time period should be sufficient to allow the pH of the aqueous solution to increase from a starting value of about 5.5 to a value of somewhere in the range of from about 6.1 to about 6.5. In this method the treatment step can be performed in any manner that ensures that the surfaces of the particulates are brought into contact with and permitted to remain in contact with the aqueous solution for the requisite time period. Suitable ways to carry out the treatment step include, but are not limited to immersing the particles in the solution or spraying the particles with the solution. Higher or lower temperatures and pH's and longer or shorter time periods are of course within the scope of the invention.

The aqueous solution should preferably comprise from about 5 to about 50 grams per liter of one of the group consisting of a primary alkaline phosphate, an alkaline chromate, an alkaline tungstate, an alkaline molybdate, an alkaline oxalate and combinations thereof; from about 0.1 to about 50 grams per liter of an oxidizing agent; and from about 0 to about 0.5 grams per liter of one of the group consisting of a wetting agent, a surfactant and combinations thereof.

In this method the aqueous solution can comprise any known primary alkaline phosphate. However, the solution preferably comprises a primary alkaline phosphate selected from the group consisting of $KH_2PO_4$, $NaH_2PO_4$, $NH_4H_2PO_4$ and combinations thereof. Any known organic or inorganic oxidizing agent can be used in the aqueous solution. Preferably the solution comprises an inorganic oxidizing agent. Preferred inorganic oxidizing agents for use in this invention include, but are not limited to $NaClO_3$, $NaBrO_3$, $KNO3$, $NaNO_3$, $KNO_2$, $NaNO_2$, $H_2O_2$, hydroxylamine, hydroxylamine sulfate, hydrazine and combinations thereof. Alternatively, the aqueous solution can comprise from about 0.3 to about 10 grams per liter of an organic oxidizing agent. Preferred organic oxidizing agents for use in the present method include sodium m-nitrobenzene, nitrophenol, dinitrobenzene sulfonate, p-nitrobenzoic acid, nitrophenol nitroguanidine, nitrilloacetic acid and combinations thereof.

By way of example, in those aqueous solutions where hydroxylamine or hydroxylamine sulfate is used as the inorganic oxidizing agent it is preferably present in an amount that is about 0.1 to about 2 grams per liter. In those aqueous solutions that comprises hydrazine, the hydrazine is present in an amount that is from about 0.1 to about 2 grams per liter of hydrazine. In those embodiments where the inorganic oxidizing agent is $H_2O_2$ it is present in an amount that is from about 0.01 to about 0.1 grams per liter solution. When the aqueous solution comprises $KNO_3$ it is preferably present in an amount of from about 0.3 to about 50 grams per liter of solution and when it comprises $NaNO_3$ it is preferably present in an amount that is from about 0.3 to about 50 and most preferably 0.5 to about 5 grams per liter of solution. When the solution comprises $KNO_2$ it is present in an amount of from about 0.1 to about 50 and preferably from about 0.1 to about 0.3 grams per liter. When the solution comprises $NaNO_2$ it is present in an amount of from about 0.1 to about 50 and preferably from about 0.1 to about 0.3 grams per liter of solution. And for the last example, when the solution comprises $NaClO_3$ or $NaBrO_3$ it is present in an amount of from about 0.1 to about 50 grams and preferably from about 5 to about 10 grams per liter of solution.

The aqueous solution for use in the present invention can optionally comprise from about 0.1 to about 1 gram per liter of a surfactant. Surfactants suitable for use in the present invention include all known surfactants. Preferred surfactants for use in the present invention, include, but are not limited to, sodium dodecyl benzyl sulfonate, lauryl sulfate, oxylated polyethers, ethoxylated polyethers and combinations thereof.

The method according to this embodiment may further comprise the step of removing the particles and rinsing the aqueous solution. An optional chromate, molybdate or nitrate sealing step can be performed to inhibit subsequent oxidation of the coated powders.

The method as described hereinabove can be summarized as follows. The first step of the method is providing a plurality of pre-alloyed iron-molybdenum particles having an average size in the range of 20 to 200 microns. As those skilled in the art will appreciate, the specific weight or volume of pre-alloyed iron-molybdenum particles provided in the first step of the method will, of course, vary depending upon whether the powder according to the present invention is manufactured using a batch or a continuous process, and will depend upon the design of the equipment used to carry out the process.

Optionally, the particles are cleaned in warm alkaline solution to remove any organic or surface contamination. Preferably, this cleaning step is carried out by immersing the particles in the solution, although spraying and any other techniques for contacting the particles with the cleaning solution under suitable conditions and for a suitable time to remove any unwanted contamination can also be used. An example of a suitable cleaning solution comprises an aqueous solution of about 30 grams/liter NaOH, about 30 grams/liter $Na_2CO_3$, about 30 grams/liter $NaPO_4$ and about 5 grams/liter $Na_2SiO_3$. The optional cleaning solution is preferably maintained at a temperature of from about 90 to about 95° C., and the particles are preferably immersed in the solution for about 15 to about 30 minutes. If spraying or other techniques are used to contact the particles with the cleaning solution, it is well within the skill of one of skill in the art to determine the appropriate duration for contacting the particles with the cleaning solution. However, an exposure in the 1 to 10 minute range is generally satisfactory. This cleaning step can further comprise decanting the cleaning solution and rinsing the thus cleaned particles in water having a temperature of from about 50 to about 60° C. This rinsing step is preferably performed several, e.g. three, times, using clean water for each rinse cycle. Thereafter, one or more cold water rinses of the particles is(are) performed, with the rinse water being decanted after each rinse and replaced with fresh water.

As the next step in the method, an optional etching step (not shown) in phosphoric acid can be carried out. This optional step is carried out at ambient temperatures wherein the particles are subjected to phosphoric acid at a concentration of 0.2% by weight for a time period of about 3 minutes followed by a rinse (three times). This etching step is used to remove contamination, in particular sulfur compounds from the surface. In the subsequent step the particles are subjected to a solution that reacts with the particles so as to create a conversion coating. The weight ratios and mechanical properties of the coating, described above, are the key factors to be considered in selecting the solution and process parameters for creating the conversion coating on the pre-alloyed molybdenum-iron particles.

A solution suitable for achieving the oxide/phosphate coating comprises ammonia dihydrogen phosphate, sodium nitrate, phosphoric acid or one or more oxidizing agents. The volumetric ratio of these constituents of the solution, and the process parameters used in the coating process are selected so that following reaction with the particles a conversion coating having the characteristics described above results.

The pre-alloyed iron-molybdenum particles are subjected to the solution by preferably immersing the particles in the same. Alternatively, the solution may be sprayed on the particles or brought into contact with the particles using other known techniques.

Next, the solution is permitted to react with the particles so as to form the conversion coating. The specific time for this reaction step will vary with the precise chemistry of the solution, the pH and temperature of the solution, and the size of the particles used. However, a reaction time of from about 1 to about 20 minutes is typically sufficient. Preferably, the particles are agitated and mixed during the reaction by known mechanical means to ensure as many of the particles as possible react with the solution. The end point of the reaction should preferably be determined to be the point at which the pH of the solution changes from a starting pH of about 5.5 to and ending pH of from about 6.1 to about 6.5. As the next step in the process of making the pre-alloyed iron-molybdenum powder of the present invention, the conversion coating solution is decanted.

The particles are then subjected to several rinse cycles to eliminate any solution remaining after the decanting step. The first rinse step, involves subjecting the particles to hot water having a temperature of about 50 to 60° for about 4 to 6 minutes. Preferably, the particles are immersed in hot water, but spray or other known techniques for applying the hot water may also be used. The particles are preferably agitated mechanically during the rinsing step to enhance rinsing action. The hot water is then decanted. Preferably, this first rinse step is repeated once or twice.

The second rinse step, is identical to the first rinse step, except that cold water having a temperature of about 10 to 20° C. is used. Thus, the particles are preferably immersed in the cold water, but the latter may also be applied using spray or other known techniques. The rinse process preferably lasts about 4 to 6 minutes, and mechanical agitation is preferably applied during the process. The cold water rinse is preferably repeated once or twice. Rinsing agents such as alcohol to reduce the surface tension of water may also be employed. Then, the powder is dried. A preferred method for drying comprises a vacuum shelf type dryer using heated air. Alternatively, the powder can be dried by placing it in a large Buchner funnel and applying suction through the powder for a time period of from about 5 to about 35 minutes. Any known method for drying powdered materials can however be employed.

As an optional step prior to drying, the powder may be sealed to prevent rusting (oxidation). This sealing step may be done using any known process for sealing powders such as chromating, alkaline nitrate/nitrite corrosion inhibitors, etc.

In yet another embodiment the present invention is directed to a method of making steel articles from particles of pre-alloyed iron molybdenum. The method comprises the steps set forth above for producing the steel powder according to the present invention and further comprises using pressure to consolidate the coated particles into the shape of the article, thereby producing a green part. Although any source of pressure is suitable to consolidate or compact the powders in this and any methods that follow, the consolidation step is preferably done in the die cavity of a uniaxial powder press. Such powder pressing methods are well known in the art of powder metallurgy. However, any method wherein adequate pressure to form a cohesive part (or cause the coated particulates to adhere to each other) can be used, is or are suitable for use in the present invention. In general, the appropriate pressures to adequately consolidate these coated particles to a dense green part should preferably be from about 50 Kpsi to about 200 Kpsi when pressing is done on a traditional powder press. Additionally, consolidation can be effected by high velocity projection (similar to thermal spraying), roll-bonding, hipping, sipping, forging, powder extruding, coining, pressing heated powders in a heated die, or rolling the coated powders or spraying cold with activation (surface oxide-removing) solutions.

The green part is then sintered at a temperature of from about 1000° C. to about 1250° C. for a time period of from about 30 minutes to about 2 hours under any suitable sintering conditions known in the art. Typically sintering is carrying out in a furnace in a reducing atmosphere such as at least 15% $H_2$ or dissociated ammonia. The precipitation of nitrides can be reduced in this way. The sintered part is then subjected to an environment of exothermic gas for a time period of from about 1 hour to about 6 hours at a temperature of about 700° C. to case harden the sintered part. Exothermic gas (also known as carburizing) compositions for case hardening steel are well known in the art. A suitable exothermic gas composition for use in case hardening a sintered part made in accordance with the present invention includes the following:

| | | |
|---|---|---|
| $CO_2$ | 0.1% by weight | |
| CO | 20.7% by weight | |
| $H_2$ | 40.6% by weight | |
| $CH_4$ | 0.4% by weight | |
| $N_2$ | 37.9% by weight | |
| $H_2O$ | 0.3% by weight | |

Dp→ = 30° F.

This invention further includes a green strength steel precursor article. The article comprises a three-dimensional structure comprised of consolidated cohesive pre-alloyed iron molybdenum particles comprising from about 0.5% by weight to about 3.5% by weight of molybdenum. Each of the particles is preferably surrounded by a substantially uniform layer of a coating comprised of from about 40% to about 85% and preferably from about 40% to about 85% by weight of a member selected from the group consisting of FeO, $Fe_3O_4$, $Fe_2O_3$, ($Fe_2O_3.H_2O$) and combinations thereof; and from about 15% to about 60% and preferably from about 15% to about 60% by weight of a member selected from the group consisting of $FePO_4$, $Fe_3(PO_4)_2$, $FeHPO_4$, $Fe_3(PO_4)_2.2H_2O$, $Fe_2(PO_4)_3.8H_2O$, and combinations thereof. Preferably the steel precursor article has an as pressed transverse rupture strength as determined in accordance with MPIF 41 (ASTM B312/B528), of at least about 10 Kpsi and preferably at least about 15 Kpsi.

Sinter Hardenable Steel Powders

In another embodiment, this invention is directed to a high strength steel powder composition comprising a mixture of a plurality of pre-alloyed steel particles and optionally particulates of graphite in an amount that is from about 0.5 to about 0.8 percent by weight of the mixture. For purposes of this invention, "particulates" should be interpreted to include powders, whiskers, fibers, and continuous wires. The high strength steel powders according to this embodiment are intended to be used as sinter hardenable materials for manufacturing sinter hardenable structural parts.

The pre-alloy particulates preferably have a diameter of from about 20 to about 200 and preferably from about 60 to about 150 microns and comprise iron and from 0.5 to about 3.5 percent by weight of molybdenum, from about 0% to about 1% and preferably from about 0.5 to about 1% by weight nickel and from about 0% to about 0.6% and preferably from about 0.2 to about 0.6% manganese. A particularly preferred pre-alloy for use in this embodiment is $FeMo_{1.5}Ni_2Mn_{.6}$. Alternatively, particulates of nickel can be admixed with pre-alloyed iron molybdenum particles instead of using the pre-alloy already containing the nickel. Each of the particles has from about 0.25% by weight to about 3% and preferably from about 0.5% to about 2.0% by weight of a coating disposed thereon. The coating comprises a substantially uniform metallurgical layer of one or more of copper, cobalt, nickel, and chromium. A substantially uniform metallurgical layer of copper is preferred. An article made by compressing this steel powder composition has an as pressed "green" strength of least about 10 Kpsi and preferably at least about 15 Kpsi as measured in accordance with MPIF 41 (ASTM B312/B528).

The invention also includes a method for preparing the high strength steel powder composition. The method comprises as a first step providing a plurality of pre-alloyed sinter hardenable steel particles. Although any known sinter hardenable steel pre-alloy powder is suitable for use in this method, a plurality of particles having a diameter of from about 20 Å to about 200 Å and comprising iron and from about 0.5 to about 3.5 percent by weight of molybdenum, from about 0% to about 0.5% by weight nickel and from about 0% to about 0.6% manganese are preferred. For the next step a substantially uniform metallurgical layer is electroplated onto the surface of each of the particles. Preferred metals for use as the metallurgical layer include, but are not limited to copper, cobalt, nickel, chromium and combinations thereof. Also suitable for use as the metallurgical layer are alloys including NiCu, MoW, etc. This coating should preferably permit adjacent particles to engage one another with a force such that the article has an as pressed transverse rupture strength of at least about 10 Kpsi, as measured in accordance with MPIF 41 (ASTM B312/B528). Additionally, the coating material can be chosen based on its ability to solubilize into the core particle.

The coating can be deposited onto the particles by any method known in the art for providing uniform metallurgical coatings on metal powders. Preferably, the coating step is done by electrochemical deposition and most preferably by immersion plating to ensure as uniform a layer of the metal material on the particulate pre-alloy steel particulate material as possible. The only requirement for the metal coating is that it be a true metallurgical coating. Hence, any known coating process (e.g., sputtering, CVD or chemical reduction) or electroplating process can be used to coat the particles in this invention. A particularly preferred process for plating the layer of metal onto the pre-alloy steel particulates is one using the fluidized bed apparatus and process taught in U.S. Pat. No. 5,603,815 to Lashmore et al. hereby incorporated in its entirety by reference herein.

The aforementioned process comprises combining particles of a particulate substrate material such as the pre-alloy steel particles used here and an electrolyte in an imperforate container; vibrating the container to generate a fluidized bed of the particles in the electrolyte and electrochemically depositing a coating on the particles from the reactants in the electrolyte. The container should preferably be electrically conductive and the process should be an electrolytic method which includes applying an electric current (direct or pulsed) through the electrolyte concurrent with the existence of the fluidized bed of particles. As an example only, nickel can be deposited from a sulfamate, sulfate, citrate, or acetate electrolyte in the fluidized bed, zinc is preferably deposited from a cyanide or ammonia electrolyte, copper is preferably deposited from a pyrophosphate or cyanide electrolyte and cobalt is preferably deposited from a sulfate or sulfamate electrolyte though many other electrolytes are available.

In a particularly preferred embodiment where the coating step is carried out by using immersion plating, the electrolytes consist of an about 1% by weight acid ammonium citrate solution with trace (from about 5 ppm to about 20% by weight) of an additive such as lead, tin or an organic to inhibit the well recognized problem of dendrite growth. Techniques for immersion plating of metallic coatings onto particles are known in the art and any known immersion plating technique is suitable for use in this invention.

As the next step a plurality of graphite particulates having a diameter of from about 0.05 nm to about 1 $\mu$m are optionally provided and a quantity of the graphite particulates are blended with the coated iron-molybdenum particles so that the graphite particles comprise from about 0.05% by weight to about 0.08% by weight of the high strength steel powder composition.

The invention is further directed to a method of making steel articles from the aforementioned particles of pre-alloyed iron molybdenum. The method comprises the steps set forth above for preparing the sinter hardenable powder according to this invention and further using pressure to consolidate the blended mixture of coated particles and graphite particles into the shape of the article, thereby producing a green part. Although any source of pressure is suitable to consolidate or compact the powders, the consolidation step is here also preferably preformed in the die cavity of a powder press. Such powder pressing methods are known in the art of powder metallurgy. However, any method wherein adequate pressure to form a cohesive part (or cause the coated particulates to adhere to each other) can be applied, is or are suitable for use in the present invention. In general, the appropriate pressures to adequately consolidate these coated particles to a green part should preferably be from about 50 Kpsi to about 200 Kpsi when pressing is done on a traditional powder press. Additionally, consolidation can be effected by high velocity spraying (similar to thermal spraying), roll-bonding, hipping, sipping, forging, powder extruding, coining or rolling the coated powders or spraying cold with activation solutions.

The green part is then sintered at a temperature of from about 1000° C. to about 1250° C. for a time period of from about 30 to about 180 minutes. Those of skill in the art will recognize that the appropriate sintering temperature is chosen based on the desired final density of the article. Moreover, when temperatures in the range of 1000° C. are used to sinter the material there is generally no controlled cooling step needed. In those instances where the green part is sintered at a temperature in the range of around 1250° C., it is preferable to cool the sintered part at a rate of from about 2° C. to about 6° C. per minute. In this and other methods detailed herein the sintering step should preferably be done in a reducing atmosphere or in a neutral oxygen free atmosphere. Such an atmosphere can be provided by nitrogen, helium, hydrogen or argon. By heating the consolidated part in a reducing atmosphere, the production of oxides is prevented.

This embodiment further includes a green strength steel precursor article comprising a three-dimensional structure comprised of consolidated metal coated pre-alloyed steel particles interspaced with particulates of graphite. Preferably the steel pre-alloy particles comprise iron and from about 0.5 to about 3.5 percent by weight of molybdenum, from about 0% to about 0.5% by weight nickel and from about 0% to about 0.6% manganese and each of substantially all of the particles is surrounded by from about 0.5% to about 3.0% and preferably about 0.5% to about 2.0% by weight of a substantially uniform metallurgical layer of copper, cobalt, nickel, chromium or alloys and combinations thereof. Copper is the preferred material for the metallurgical layer. The particles of graphite interspaced between the coated iron-molybdenum pre-alloy particles preferably have a diameter of from about 0.05 nm to about 1 $\mu$m. The particles of this green strength part engage one another with a force such that the article has an as pressed transverse rupture strength of at least about 10 Kpsi and most preferably at least about 15 Kpsi, as measured in accordance with MPIF 41 (ASTM B312/B528.

EXAMPLES

Example 1

Minimum Shrinkage

Thirty (30) kilograms of pre-alloyed $Fe_{98.5}Mo_{1.5}$ by weight powder (Pyron PMMA 150) having a mean particle size of about 80 microns are cleaned by immersion into an aqueous solution of about 30 grams/liter NaOH, about 30 grams/liter $Na_2Co_3$, about 30 grams/liter $NaPO_4$ and about 5 grams/liter $Na_2SiO_3$ maintained at a temperature of from about 90 to about 95° C. for a time period of about 20 minutes. The clean particles are placed in a Pyrex beaker and a solution containing 5 g/l of $NH_4H_2PO_4$, 0.3 g/l $NaNO_2$, 5 g/l $NaNO_3$ is added to the beaker so that the particles are completely immersed in the solution. The solution has a pH of about 5.5 and is maintained at a temperature of about 40° C. The particles are then stirred continuously with a glass rod to ensure as many of the particles as possible contact the solution. After about 5 minutes of this immersion and stirring the solution is decanted.

Immediately thereafter, hot water having a temperature of about 55° C. is added to the beaker so that the particles are fully immersed. The particles remain immersed in the water for about 5 minutes, and are agitated to enhance rinsing action. The hot water is decanted and this hot water rinse step is repeated two times. Thereafter, cold water at a temperature of from about 10° C. to about 20° C. is added to the beaker so that the particles are immersed. Following about a 5 minute immersion with agitation, the cold water is decanted. Then, this cold water rinse step is repeated once.

The coated powders are charged into the 1.23 cm die of a 50 ton hydraulic press (Dake 50H equiped with a precision die set) and pressed at 55 tons/inch$^2$. The part is removed from the die and sintered at 1000° C. for one hour and then case hardened by being exposed for 4 hours at a temperature of 700° C. to the following endothermic gas composition:

| | |
|---|---|
| $CO_2$ | 0.1% by weight |
| CO | 20.7% by weight |
| $H_2$ | 40.6% by weight |
| $CH_4$ | 0.4% by weight |
| $N_2$ | 37.4% by weight |
| $H_2O$ | 0.3% by weight |

Dp = =30° F.

Figure 2:
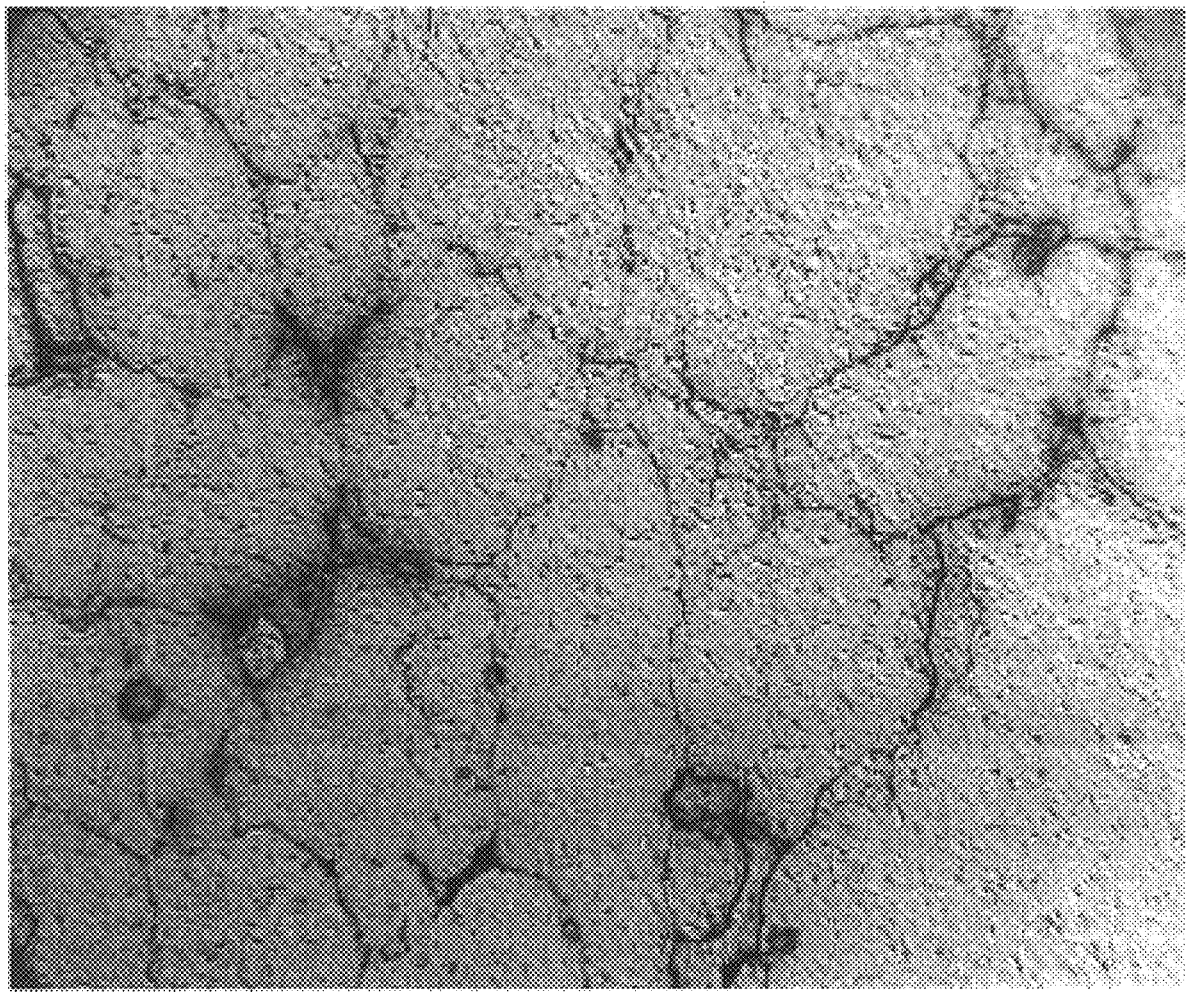
FIG. 2 is an optical micrograph of conversion coated high molybdenum steel. High uniformity of the coating is exhibited.

FIG. 2 is an optical micrograph that is taken of the coated steel showing high coating uniformity.

The following measurements were taken for the part:

| | |
|---|---|
| TRS-green | 11,000 psi |
| TRS-HT | 155,000 psi |
| Young's modulus | $22 \times 10^6$ |
| Poisson's ratio | 0.24 |
| Tensile strength | 58,000 psi |
| Case depth | 6 mm |
| Rockwell hardness (apparent) | Rc 10 |
| Vickers Hardness | $VHH_{50}$ = 400 |
| Density | 7.3 g/cc |
| Shrinkage axial | <0.5 mils |
| Shrinkage radial | <2 mils |

Example 2

Maximum Density

Thirty (30) grams of 1.5 Mo—Fe alloy ($Fe_{98.5}Mo_{1.5}$) powder by weight powder (Pyron PMMA150) are coated and pressed in the same manner as that set forth in Example 1.

The part is removed from the die and sintered at 1200° C. for one hour and then cased hardened in accordance with the manner set forth in Example 1.

The following measurements were taken for the part:

| | |
|---|---|
| TRS-green | 11,000 psi |
| TRS-HT | 170,000 psi |
| Young's modulus | 26,000 |
| Poisson's ratio | 0.25 |
| Tensile strength | 78,000 psi |
| Case depth | 4 mm |
| Rockwell hardness (apparent) | Rc 35 |
| Vickers Hardness | $VHH_{50}$ = 450 |
| Density | 7.55 g/cc |
| Shrinkage axial | <11 mils |
| Shrinkage radial | <7 mils |

Example 3

Minimal Dimensional Change

Thirty (30) grams of 1.5 Mo—Fe alloy ($Fe_{98.5}Mo_{1.5}$) powder (Pyron PMMA150) are coated with copper by immersion plating in a solution containing copper, ammonium citrate and a trace quantity of a lead "stabilizer." The solution has a pH of 5.5.

Figure 3:
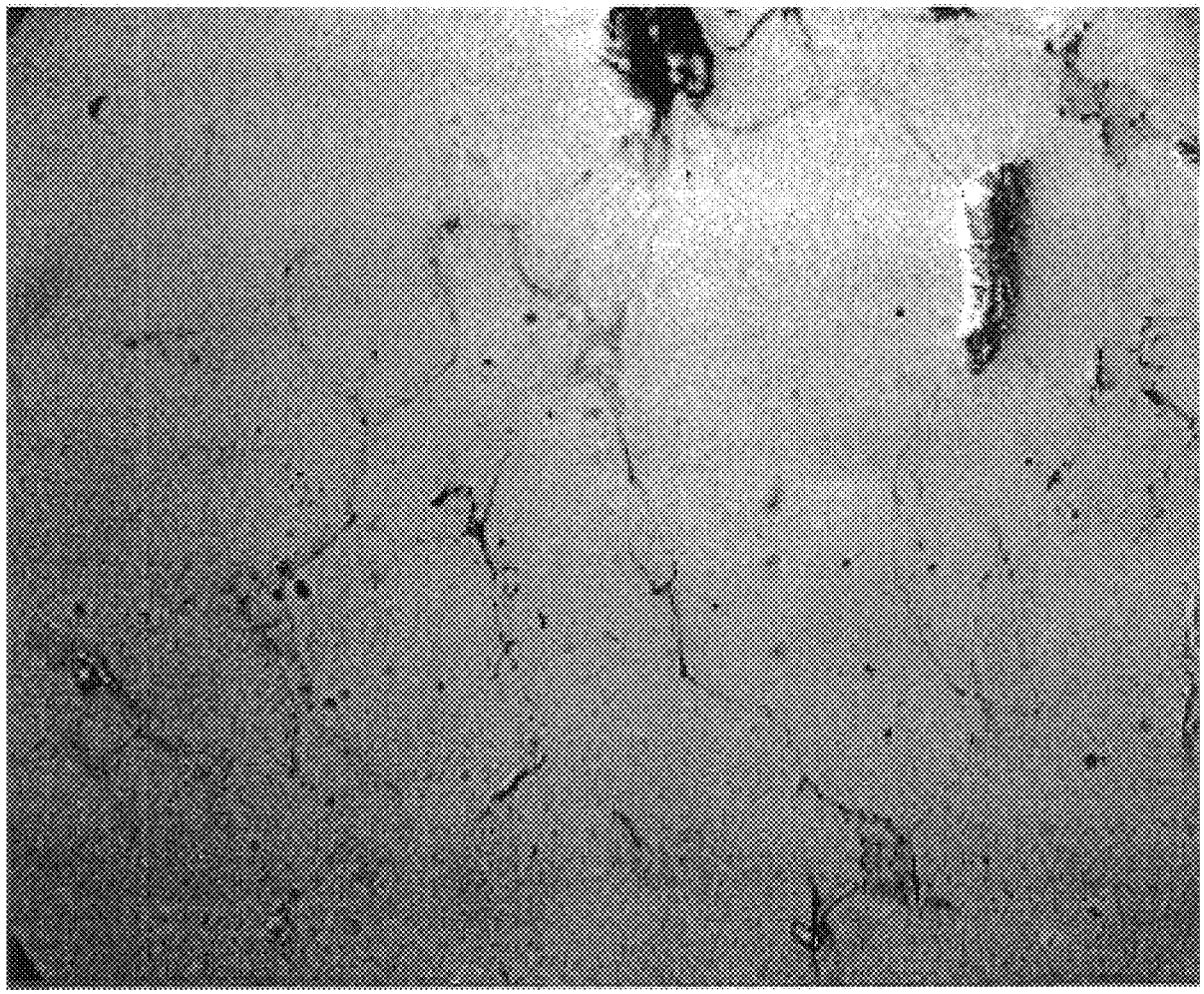
FIG. 3 is an optical micrograph of compressed copper coated high (3.5%) molybdenum steel before heat treatment. This picture illustrates the extreme uniformity of the coating.

The coated powder-graphite mixture is charged into the 1.23 cm die of a 50 ton hydraulic press (Dake 50H equipped with a high precision die set) and pressed at 55 tons/inch². FIG. 3 is an optical micrograph of compressed copper coated high (3.5%) molybdenum steel before heat treatment. This picture illustrates the extreme uniformity of the coating. The part is removed from the die and sintered at 1000° C. for 1 hour and allowed to cool at a rate of 2° C. per minute. The uniform coatings around each particle allow for shorter diffusion distances between the metal coating material and the core particle thus eliminating the need for higher temperatures to promote homogeneity in the finished part.

The following measurements were taken for the part:

| | |
|---|---|
| Transverse Rupture Strength (TRS) | 15,000 psi |
| TRS heat treated | 170,000 psi |
| Young's modulus | 24,000 |
| Poisson's ratio | 0.24 |
| Rockwell hardness (apparent) | HRb 90 to HRC 10 |
| Vickers Hardness | $VHH_{50}$ = 200 |
| Density | 7.35 g/CC |
| Shrinkage axial | <2 mils |
| Shrinkage radial | <7 mils |
| Tensile strength | 89 Kpsi |

Example 4

Maximum Density

Thirty (30) grams of 1.5 Mo—Fe alloy ($Fe_{98.5}Mo_{1.5}$) powder are coated with copper in accordance with the procedure set forth in Example 3 above. The powder is dried and blended with 0.5% by weight of graphite fibers.

The coated powder-graphite mixture is charged into the 1.23 cm die of a 50 ton hydraulic press (Dake 50H) and pressed at 55 tons/inch². The part is removed from the die and sintered at 1250° C. for 1 hour and allowed to cool at a rate of 2° C. to 6° C. per minute.

The following measurements were taken for the part:

| | |
|---|---|
| TRS-heat treated | 190,000 psi |
| Young's modulus | 26,000 |
| Poisson's ratio | 0.25 |
| Rockwell hardness (apparent) | Rc 45 |
| Vickers Hardness | $VHH_{50}$ = 450 |
| Density | 7.5 g/cc |
| Shrinkage axial | <5 mils |
| Shrinkage radial | <11 mils |
| Green Strength | 11 to 15 Kpsi |
| Tensile strength | 215,000 psi |

What is claimed is:

1. Steel powder comprising:

a. a plurality of pre-alloyed iron-molybdenum particles comprising from about 0.5 to about 3.5 percent by weight of molybdenum having a diameter size of from about 20 to about 200 microns; and b. from about 0.001% by weight to about 0.05% by weight of a coating disposed on each of the particles, said coating comprising from about 40% to about 85% by weight of a member selected from the group consisting of FeO, $Fe_3O_4$, $Fe_2O_3$, ($Fe_2O_3.H_2O$) and combinations thereof; and from about 15% to about 60% by weight of a member selected from the group consisting of $FePO_4$, $Fe_3(PO_4)_2$, $FeHPO_4$, $Fe_3(PO_4)_2.2H_2O$, $Fe_2(PO_4)_3.8H_2O$, $FeCrO_4$, $FeMoO_4$, $FeC_2O_4$, $FeWO_4$, and combinations thereof.

* * * * *